US012561940B2

(12) United States Patent
Braisaz et al.

(10) Patent No.: US 12,561,940 B2
(45) Date of Patent: Feb. 24, 2026

(54) METHOD FOR PERFORMING TOPOGRAPHIC MEASUREMENT AND TOPOGRAPHIC MEASURING MACHINE

(71) Applicant: INSIDIX, Seyssins (FR)

(72) Inventors: Régis Braisaz, Réaumont (FR); Pierre Vernhes, Saint-Martin-d'Uriage (FR)

(73) Assignee: INSIDIX, Noyarey (FR)

( * ) Notice: Subject to any disclaimer, the term of this patent is extended or adjusted under 35 U.S.C. 154(b) by 320 days.

(21) Appl. No.: 18/132,526

(22) Filed: Apr. 10, 2023

(65) Prior Publication Data

US 2023/0326176 A1 Oct. 12, 2023

(30) Foreign Application Priority Data

Apr. 11, 2022 (FR) ...................................... 2203324

(51) Int. Cl.
| | |
|---|---|
| *G06V 10/60* | (2022.01) |
| *G01B 11/25* | (2006.01) |
| *G06V 10/145* | (2022.01) |
| *G06V 10/46* | (2022.01) |
| *G06V 10/74* | (2022.01) |

(52) U.S. Cl.
CPC .............. *G06V 10/60* (2022.01); *G01B 11/25* (2013.01); *G06V 10/145* (2022.01); *G06V 10/462* (2022.01); *G06V 10/761* (2022.01)

(58) Field of Classification Search
CPC ................ G01B 11/25; G01B 2210/56; G01B 11/2527; G06V 10/145; G06V 10/462; G06V 10/761
See application file for complete search history.

(56) References Cited

U.S. PATENT DOCUMENTS

| | | | | |
|---|---|---|---|---|
| 2004/0207402 | A1* | 10/2004 | Kellman | .......... G01R 33/56554 |
| | | | | 324/309 |
| 2021/0080252 | A1 | 3/2021 | Cho et al. | |
| 2021/0299879 | A1* | 9/2021 | Pinter | .................... B25J 9/1697 |
| 2021/0310791 | A1 | 10/2021 | Tabata | |

FOREIGN PATENT DOCUMENTS

JP 2012-233782 A 11/2012

* cited by examiner

*Primary Examiner* — John R Wallace
(74) *Attorney, Agent, or Firm* — Oliff PLC

(57) ABSTRACT

A topographic measurement method includes provision of a sample including first surface provided with plurality of salient patterns. The first surface of the sample is illuminated by means of structured light that defines several repetitive patterns. The structured light is emitted at first angle with respect to first surface. A first image of first surface of sample illuminated by structured light is acquired. The first image is acquired at second angle with respect to first surface. A second image of illuminated sample is acquired. The second image differs from first image by value of exposure time. The first image is compared with second image to determine presence of at least one artefact on the first image. A reference image is formed from the first image and the second image. The reference image is devoid of any artefact. A quantity representative of the first surface is calculated from the reference image.

10 Claims, 2 Drawing Sheets

Provide sample — S1

Acquiring images — S2
- Reference Images — S2a
- Images 1st series — S2b
- Images 2nd series — S2c
- Images 3rd series — S2d
- Images 4th series — S2e Forming Working image — S3
- (Images 1st series) — S3a
- (Images 2nd series) — S3b
- (Images 3rd series) — S3c
- (Images 4th series) — S3d Calculing values — S4

METHOD FOR PERFORMING TOPOGRAPHIC MEASUREMENT AND TOPOGRAPHIC MEASURING MACHINE

BACKGROUND OF THE INVENTION

The invention relates to a method for performing topographic measurement and to a topographic measuring machine.

STATE OF THE ART

In a large number of technical fields, component parts are used that are salient from a main surface. Utmost care must be taken to master the shape and dimensions of these salient parts. The salient parts are for example electrically conducting pads that will act as electric contact for an electronic chip or any other electronic device. A good dimensional mastery of the salient parts enables a high-performance electric contact to be achieved.

It is important to be able to measure the shape and dimensions of the multiple salient parts as precisely and as quickly as possible.

It is known to perform measurement of the dimensions of the salient parts by means of an optical method. A textured light is applied on the surface of a sample that has multiple salient parts. The textured light defines a plurality of repetitive patterns that are applied on the surface of the sample.

Several images of the surface of the sample illuminated by the textured light are acquired. By analysing the different images, the dimensions and shape of the salient parts can be calculated.

The quality of measurement is greatly dependent on the quality of the images that were acquired. A requirement therefore exists to improve the quality of the images used in the steps of calculating the dimensions and shape of the salient parts.

SUMMARY OF THE INVENTION

One object of the invention consists in providing a method for performing topographic measurement that presents better performances than the methods of the prior art.

This result tends to be achieved by means of a method for performing topographic measurement that comprises:

- providing a sample comprising a first surface provided with a plurality of salient patterns;
- acquiring a plurality of images of the first surface of the sample, the plurality of images comprising reference images of the sample, each reference image corresponding to the sample illuminated with a structured light, the structured lights of the reference images each defining several repetitive patterns and differing from one another by the phase and/or the frequency of the repetitive patterns. The method is remarkable in that the plurality of images comprises at least a first series of images of the first surface of the sample, the first series of images being acquired when the first surface of the sample is illuminated by a first structured light, the first structured light defining several repetitive patterns and the images of the first series of images differing from one another by the application angle of the first structured light with respect to the first surface;
- comparing the images of the first series of images so as to determine the presence of at least one artefact on at least one image of the first series of images;

- forming at least one working image at least from the first series of images, the at least one working image being devoid of said at least one artefact or reducing the extent of said at least one artefact;
- calculating at least one quantity representative of the sample from the at least one working image and the reference images.

Preferentially, the first series of images comprises an image of the reference images and the at least one working image replaces said image of the reference images.

Preferentially, the plurality of images has several first series of images that each comprise an image of the reference images. Each first series of images is used to form a working image devoid of at least one artefact or having an artefact of reduced extent. Each working image replaces one of the reference images.

Preferentially, the plurality of images comprises at least a second series of images of the first surface of the sample, the second series of images being acquired when the first surface of the sample is illuminated by the first structured light, the images of the second series of images differing from one another by their exposure time, the application angle of the first structured light being constant for the second series of images and corresponding to one of the angles of the first series of images. The measurement method comprises:

- comparing the images of the second series of images so as to determine the presence of at least one artefact on at least one image of the second series of images and
- forming at least one working image at least from the second series of images, the at least one working image being devoid of said at least one artefact or reducing the extent of the artefact.

Preferentially, the second series of images comprises an image of the reference images. The at least one working image formed from the second series of images replaces said image of the reference images.

Preferentially, an image of the reference images belongs to the first series of images and to the second series of images. The first series of images and the second series of images are used to form a working image that replaces said image of the reference images.

Preferentially, the plurality of images has several second series of images that each comprise an image of the reference images. Each second series of images is used to form a working image devoid of at least one artefact or having an artefact of reduced extent. Each working image replaces images of the reference images.

Preferentially, the plurality of images comprises at least a third series of images of the first surface of the sample, the third series of images being acquired when the first surface of the sample is illuminated by a second structured light, the images of the third series of images differing from one another by the colour of the structured light, the application angle of the second structured light being constant for the third series of images and corresponding to one of the angles of the first series of images. The measurement method comprises:

- comparing the images of the third series of images so as to determine the presence of at least one artefact on at least one image of the third series of images and
- forming at least one working image at least from the third series of images, the at least one working image being devoid of said at least one artefact or reducing the extent of the artefact.

Preferentially, comparing the images of the first series of images comprises identifying a displacement of an area presenting a greater luminosity than the mean luminosity of the image of the first series according to the application angle of the first structured light, the artefact being a spurious reflection.

Preferentially, comparing the images of the first series of images comprises identifying a modification of the extent of an area presenting a luminosity that is lower than the mean luminosity of the image of the first series according to the application angle of the first structured light, the artefact being a shadow.

Preferentially; comparing the images of the first series of images comprises extracting the light intensity modifications of the repetitive patterns originating from the structured light and comparing said light intensity modifications.

It is a further object of the invention to provide a topographic measuring machine that presents improved performances compared with machines of the prior art and that enables quantities of the sample to be calculated more precisely.

This result tends to be achieved by means of a topographical measuring machine that comprises:

- a support having a surface designed to support a sample;
- projection means configured to emit different structured lights, the structured lights each defining several repetitive patterns and differing from one another by the phase and/or the frequency of the repetitive patterns;
- the image capture means configured to acquire images of the sample illuminated by one of the different structured lights;
- a control circuit configured to acquire several reference images of the sample illuminated by different structured lights, the structured lights of the reference images each defining several repetitive patterns and differing from one another by the phase and/or the frequency of the repetitive patterns.

The topographic measuring machine is remarkable in that:

- the projection means are configured to define several angles of application of the structured light with respect to the surface of the support;
- the control circuit is configured to acquire a first series of images of the sample illuminated by the first structured light, the first structured light defining several repetitive patterns and the images of the first series of images differing from one another by the application angle of the first structured light with respect to the surface of the support;
- the control circuit is configured to compare the images of the first series of images so as to determine the presence of at least one artefact on at least one image of the first series of images;
- a processing circuit is configured to form at least one working image at least from the first series of images, the at least one working image being devoid of said at least one artefact or reducing the extent of said at least one artefact;
- the processing circuit is configured to calculate at least one quantity representative of the sample from the at least one working image and the reference images.

DESCRIPTION OF THE DRAWINGS

Other advantages and features will become more clearly apparent from the following description of particular embodiments and implementation modes of the invention given for non-restrictive example purposes only and represented in the appended drawings, in which.

DETAILED DESCRIPTION

When a sample has one or more salient parts that are arranged salient from a first surface of a substrate, it is advantageous to characterise the sample and preferentially the salient part or parts, i.e. it is advantageous to calculate quantities representative of the sample and more preferentially to calculate quantities representative of the salient part(s). A quick way of doing this is to use an optical characterisation taking several images of the sample. It is therefore important to obtain quality images to deduce therefrom the quantity of the sample and more particularly of the salient parts as precisely as possible.

Figure 1:
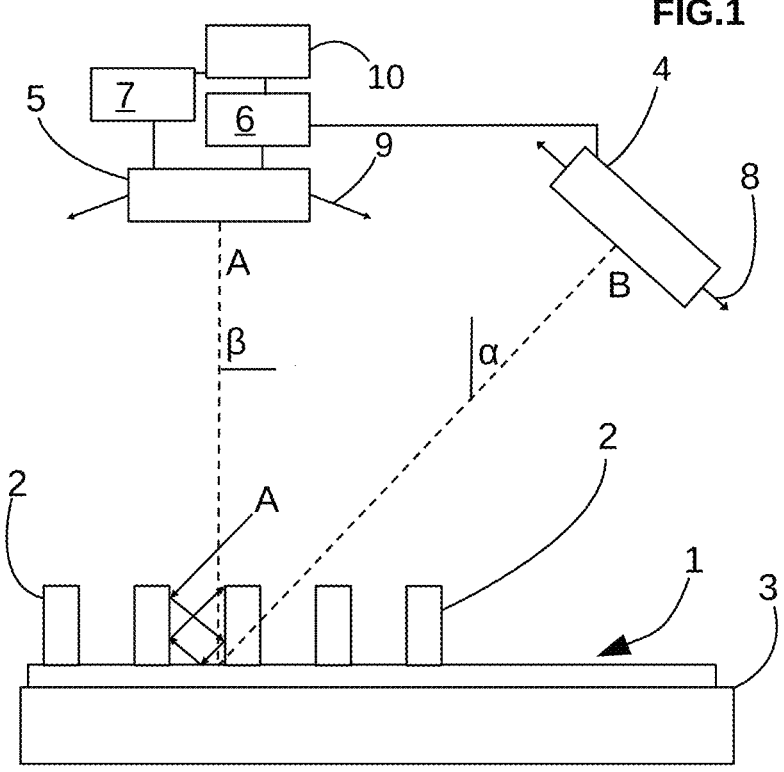
FIG. 1 schematically illustrates a topographic measuring machine.
Figure 3:
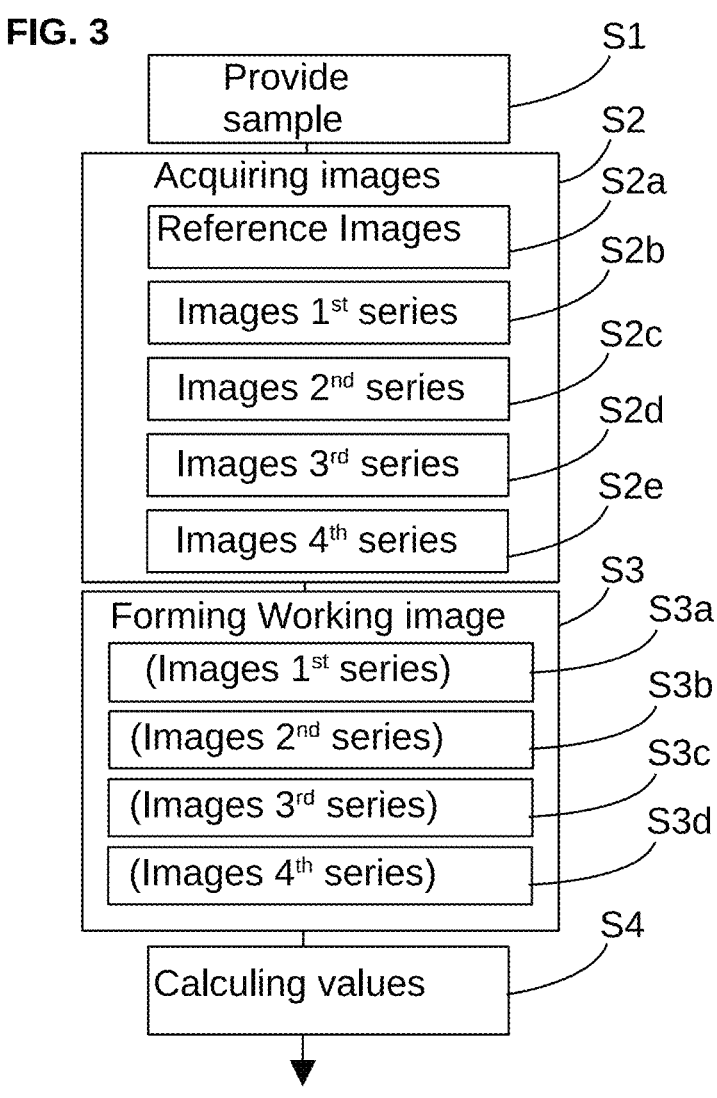
FIG. 3 schematically illustrates a method for performing topographic measurement.

In a first step S1 illustrated in FIG. 3, a sample 1 is provided comprising a first surface provided with a plurality of salient patterns 2 (see FIG. 1). The sample 1 is arranged on a support 3. The salient patterns 2 can be of any shape. However, it is particularly advantageous for the salient patterns 2 to be in the form of spheres or hemi-spheres, cones, straight pads or other simple shapes facilitating calculation of the shape and calculation of the transverse dimensions of the salient patterns 2. The transverse dimensions are dimensions measured in directions perpendicular to the axis of the normal of the support 3 supporting the sample 1 and which also represents the normal to the first surface. The normal to the first surface is represented by line A illustrated in FIG. 1 which represents a topographic 3 measuring machine able to implement the measurement method.

The salient patterns 2 can be made from any possible material. However, the method proves to be particularly advantageous when the salient patterns 2 are made from metallic materials and more generally from materials that reflect light. It was observed that patterns made from metallic materials reflect light which has the effect of generating artefacts. It was also observed that emission of a textured light from the projection means 4 to the salient patterns 2 generates a shadow phenomenon which has the effect of one surface of the salient patterns 2 being better illuminated than the others. This phenomenon is accentuated as the distance from the normal to the first surface increases.

The topographic measurement method comprises illumination of the first surface of the sample 1 by means of a structured light. The structured light defines several repetitive patterns for example several fringes. Illumination of the first surface is performed by the projection means 4. The structured light can be a greyscale image or in a shade of other colours and possibly black and white. The structured light defines patterns that are repeated with a predefined frequency and a predefined phase. The projection means 4 advantageously comprise a projector configured to project the structured light preferably in the visible range.

The structured light advantageously forms a fringe pattern, for example of moiré or "shadow moiré" type. In one embodiment, the projector directly emits a fringe pattern. In an alternative embodiment, the structured light is formed by means of a mask through which the light originating from the projector passes. The mask comprises openings and opaque regions, for example in the form of a Ronchi grating. It is also possible to combine these two techniques.

The measurement method comprises acquisition of a plurality of images of the first surface of the sample 1 in a step S2, and in particular a plurality of reference images in a step S2a.

The reference images comprise deformation of the repetitive patterns of the structured light on the surface of the sample. The application angle of the structured light being known as is the repetition pitch of the repetitive patterns, it is possible to deduce the deformation of the repetitive patterns therefrom and therefore to deduce therefrom information relating to the quantities relative to the sample. By using several repetitive patterns that differ from one another by the repetition pitches and the phase of the repetitive patterns (possibly with the size of the repetitive patterns), quantities relative to the sample can then be calculated.

In a step S4, the reference images are used to calculate at least one quantity of the sample and preferentially a quantity representative of the plurality of salient patterns 2. In preferential manner, the reference images are used to calculate at least one quantity chosen from the coplanarity of the salient parts, the shape of the salient parts in a cross-sectional plane, i.e. perpendicular to line A, the repetition pitch of the salient parts in one or more directions perpendicular to line A, a transverse dimension of at least one of the salient patterns, i.e. in a direction perpendicular to line A, and the height of one or more the salient patterns, i.e. the dimension along line A.

To acquire images, it is advantageous to use the image capture means 5 that are configured to acquire images of the first surface of the sample 1. The image capture means 5 advantageously comprise a camera that is arranged to capture the structured light applied on the surface of the sample 1. The camera is designed to provide topography measurements of the surface of the system from the captured structured light. In the illustrated embodiment, the optical axis of the image capture means 5 coincides with the normal A to the surface of the support 3.

In order to characterise the sample, it is advantageous to successively apply different structured lights. The structured lights define repetitive patterns, preferably fringes. To perform characterisation of the sample, a plurality of reference images of the first surface of the sample 1 will be acquired in step S2a. Each reference image is acquired with a different structured light from the others. The structured lights differ from one another by the phase and/or the frequency of the repetitive patterns. By varying frequency, the repetition pitch of the repetitive patterns is made to vary and it is also advantageous to make the width of the patterns vary, in particular that of the fringes. By varying the phase, the position of the fringes on the sample is made to vary, a white area becomes a black area or a greyscale area. By varying the phase and frequency of the patterns, the person skilled in the art is able to characterise the sample 1. The change in intensity representing a transition from a white area to a black area can be of sine wave or triangular shape, in step form or any other suitable form.

Acquisition of several reference images that differ from one another by the phase and frequency of the repetitive patterns, preferably of the fringes, enables the quantities representative of the sample to be calculated.

The different reference images are analysed together so as to determine the topography of the sample by means of a known technique. The deformation of the fringes on the surface of the sample is observed to deduce the characteristics of the sample and preferentially of the salient patterns therefrom.

The distance between two the salient patterns 2, the height of each salient pattern 2, the lateral dimensions of each salient pattern 2, the shape of each salient pattern 2 and the planarity of the surface receiving the salient patterns 2 can be calculated. The mathematical surface passing through the highest point of the salient pattern (along line A) can also be calculated for each salient part 2. It is further possible to calculate the coplanarity of the peaks of the salient patterns 2, i.e. to determine whether the peaks of the salient patterns 2 belong to the same plane or not and possibly the amplitude (along fine A) of the surface that passes through all the peaks of the salient patterns 2. It is also possible to calculate characteristics of the surface passing through the peaks of the salient patterns 2 and/or characteristics of the surface of the substrate supporting the salient patterns 2. Calculation of the characteristics can be a calculation of bow and twist type.

However, these images present artefacts that prevent a more precise characterisation of the sample 1, and it is therefore important to perform acquisition of additional images so as to deliver a finer characterisation of the quantities representative of the sample and preferentially of the salient 2 patterns.

The structured light is emitted at a first angle $\alpha$ with respect to the first surface. The projection means 4 project the structured light with a first angle $\alpha$ with respect to the first surface of the sample 1, also called the application angle $\alpha$. First angle $\alpha$ is measured with respect to the normal of the surface of the support 3 supporting the sample and that corresponds substantially to the normal of the first surface of the substrate that receives the salient patterns. Other configurations are possible.

To improve the quality of characterisation, it is advantageous to acquire several images under different conditions to be able to determine the presence of artefacts and to be able to eliminate these artefacts or at least reduce the importance of the artefacts. The additional images taken can be used to replace a reference image by another reference image calculated so as to reduce the extent of at least one artefact or even eliminate at least one artefact or to add a reference image to the reference images already taken so as to reduce the weight of the artefacts. This makes for a more precise calculation of the quantities characteristics of the sample.

In a step S2b, it is advantageous to acquire at least a first series of images of the first surface of the sample 1. The first series of images is acquired when the first surface of the sample 1 is illuminated by a first structured light. The first structured light defines several predefined repetitive patterns and the images of the first series of images differ from one another by the application angle $\alpha$ of the first structured light with respect to the first surface.

The projection means 4 are configured to apply the same first structured light with different values of first angle $\alpha$. First angle $\alpha$ is preferentially measured between the optical axis of the projection means 4 and the normal to the plane of the support 3 receiving the sample. Depending on the configurations, the projection means 4 comprise a mobile projector that moves to define the multiple angles $\alpha$. It is also possible to have several projectors, each projector being associated with a predefined angle. It is further possible to have several mobile projectors.

First angle $\alpha$ is advantageously comprised between 5° and 175°, preferably between 10° and 170°, more preferentially between 25° and 155° and even more preferentially between 25° and 55° and between 115° and 155°. The angles comprised between 0° and 90° correspond to the projection means 4 arranged on one side of the sample, i.e. on one side of the support and therefore on one side of the image capture means 5, for example on the right-hand side in FIG. 1, whereas the angles comprised between 90° and 180° correspond to the projection means 4 arranged on the other side of the sample, i.e. on the other side of support and therefore on the other side of the image capture means 5, for example on the left-hand side in FIG. 1. By using the projection means 4 able to successively illuminate the two opposite surfaces of the salient patterns 2, for example with two projectors, it is easier to better define the contours of the salient patterns 2.

Among the plurality of images, at least a first series of images of the first surface of the sample 1 is acquired. The first series of images is acquired when the first surface of the sample 1 is illuminated by a first structured light. The first structured light defines several repetitive patterns.

It was observed that, when light radiation reflection phenomena occur between the salient patterns 2, a part of the emitted structured light is reflected back to capture means 5 in the form of a specular reflection which generates the appearance of a very luminous area on at least a part of the images. The very luminous area is an area having a greater luminosity than the mean luminosity of the image. The very luminous area is a low contrast area which makes more difficult or prevents observation of the characteristics of the patterns of the structured light and in particular the variations of the light intensity. The spurious reflection and more particularly the specular reflection generates a poor local contrast of the projected repetitive patterns. The poor contrast introduces artefacts and reduces the precision of the topographic reconstruction calculation. It is then more difficult to characterise the sample, for example the characteristics of the salient patterns, more particularly the edge of salient pattern 2, the shape of salient pattern 2 or a ridge. This very luminous area creates an artefact that makes measurement of the quantities representative of the salient patterns 2 more difficult. By modifying the application angle $\alpha$, it is possible to displace the reflection points of the emitted structured light and therefore to displace the position of the very luminous area between the images of the first series. By comparing the position of the very luminous areas on the different images of the first series according to the value of the application angle $\alpha$, it is possible to identify a displacement of a very luminous area according to the application angle $\alpha$ thereby enabling the presence of an artefact to be determined, in the present case a spurious reflection or a refraction.

Modulating the application angle $\alpha$ also enables the shadow phenomena to be modified thereby enabling the edges of the salient patterns 2 to be determined while at the same time keeping a structured light that is emitted from the same side of the support and therefore of the sample. A shadow leads to the appearance of a low-luminosity area, i.e. a low-contrast area. Due to the low contrast, it is difficult to observe the repetitive patterns of the structured light and therefore to calculate the relevant information relating to the sample, preferentially to the salient patterns 2.

Modulating the application angle $\alpha$ also enables the influence of the multiple reflection phenomena between the salient patterns to be reduced. The multiple reflection will reflect a projected intensity to the image capture means 5 which should originate from another location on the sample. This locally distorts the reconstruction calculation. To reduce the influence of the multiple reflections, it is also advantageous to modify the frequency and/or the pitch of the textured light.

Figure 2:
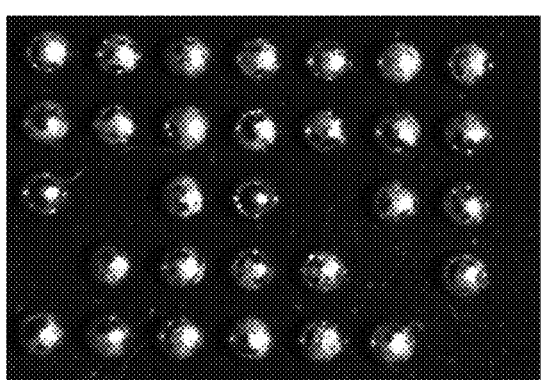
FIG. 2 is a photograph of a sample having the salient patterns in the form of a hemi-sphere illuminated by a uniform light.

For example purposes, FIG. 2 illustrates a sample 1 having a substrate capped by the salient patterns substantially in the form of hemi-spheres. The sample is illuminated by a uniform white light applied with an angle equal to 45°. It is apparent that the salient patterns do not all reflect the light in the same manner and that the salient patterns all present a specular reflection area and a shadowed area. It is also apparent that the central salient pattern presents several reflection points representing the reflections of the adjacent the salient patterns.

In general manner, modulation of the application angle $\alpha$ makes it possible to determine the presence of at least one artefact that appears in the form of a high luminosity area or a low luminosity area as a consequence of the reflection and refraction phenomena.

Modulation of the application angle $\alpha$ allows acquisition of a plurality of images enabling the quantities representative of the sample to be better determined by facilitating determination of the characteristics of the repetitive patterns, by reducing the extent of the artefact and/or by displacing artefacts enabling a sufficient contrast to be obtained to identify the presence of at least a part of a repetitive pattern of the textured light.

The images of the first series of images differ from one another by the value of the application angle $\alpha$ of the first structured light with respect to the first surface. Modulating the application angle $\alpha$ results in the interaction between the sample and the structured light being modified. Each image corresponds to a known value of the application angle $\alpha$. Modulating the application angle $\alpha$ of the first light modifies the size of the shadow areas and the angle of projection of the structured light on the side walls of the salient patterns 2 and therefore the reflections and refractions.

Acquisition of several images to form the first series of images enables the repetitive patterns of the structured light to be better observed thereby enabling the dimensional characteristics of the salient patterns 2 to be better identified preferentially when the first series of images comprises images where the first structured light is emitted in opposite directions, i.e. with angles having positive and negative values, i.e. with the projection means 4 that are arranged on one side or the other of the sample 1.

It is particularly advantageous to have images of the first series of images that correspond to different values of the application angle $\alpha$ and that are emitted from a same side of the sample and/or from a same side of the image capture means 5. For example at least two or at least three images are acquired when the first light is applied on the sample 1, the images differing from one another by the value of the application angle $\alpha$, the first light being emitted from a same side of the support 3. For example, the three images are acquired for three different values of angle $\alpha$ that differ from one another by at least 10°. For example, the three images are acquired for angles $\alpha$ comprised between 80° and 10°, preferably between 70° and 20°, and even more preferably between 60° and 30°, for example at 55°, 45° and 35°.

The use of several images associated with values of angles $\alpha$ preferably having a difference of less than 30°, preferentially less than 20° or even 15° or 10°, enables the displacement of the artefacts according to the application angle $\alpha$ to be monitored more easily. The difference of angle $\alpha$ between the images is preferably greater than 1° and more preferentially greater than 5°.

It is also advantageous for the first series of images to have images at different angles α with the structured light emitted from one side of the sample and several images at different angles α with the structured light emitted from the other side of the sample 1. The two sides of the sample 1 are illuminated under several different conditions to improve the quality of calculation of the quantities characteristic of the sample 1.

In a step S3*a*, the images of the first series of images are used to form a working image that will form an additional reference image or that will replace one of the reference images In step S3*a*, it is advantageous to compare the images of the first series of images so as to identify the presence of one or more artefacts that correspond to areas having a weak luminosity or to areas having a strong luminosity, i.e. to low contrast areas.

Once the artefact or artefacts have been identified, the images of the first series are used to form a working image that represents the sample and that is devoid of at least one of the identified artefacts or the extent of which artefact is reduced.

The images of the first series can be used in different ways. It is possible to identify areas representing artefacts on the images and to search in the other images for the same area devoid of the artefact in order to form a working image that corresponds to a stack of the multiple first images that form the first series of images and that are added to one another, for example in the form of tracings having areas with different weights.

In particularly advantageous manner, it is beneficial to process the images of the first series of images to identify the patterns of the first structured light and preferentially to extract the modifications of the structured light defining the repetitive patterns. For example, if the structured light defines fringes in greyscale that are represented by a sine wave variation of the intensity, it is advantageous to search for this sine wave variation in the images. As the fringes are deformed by the sample, the variations are more necessarily sine wave variations, but the variations are transposable between the images as the frequency is known as is the application angle α. It is then possible to compare the images by comparing the variations of intensity of the structured light so as to estimate the deformations of the patterns on the surface of the sample, the application angle α being known. This configuration is particularly advantageous as it makes it possible not to take account of the light intensity variations on the salient patterns 2 due to the variation of the application angle α. The working image is represented by the light intensity variations on the sample. This working image is used with the reference images that also possess the light intensity variations on the sample so as to provide a characterisation of better quality.

In advantageous manner, an image of the first series of images is one of the reference images. The working image is then formed to replace the reference image of the first series of images. The working image is of better quality than the reference image that it replaces as it has eliminated or reduced the artefact.

In even more advantageous manner, several first series of images are acquired and each first series of images possesses one of the reference images. Each first series of images enables a working image designed to replace a reference image to be formed, which improves calculation of the characteristic quantities of the sample 1.

Preferentially, the several first series of images use the same values of the application angles α.

In particularly advantageous manner, the images of the first series of images are acquired by only varying the application angle α so as to facilitate comparison of the high luminosity areas and the low luminosity areas. For example, the images of the first series of images are acquired without varying the exposure time, the patterns of the textured light, the colour of the textured light, or the angle of the acquisition means. It is also advantageous for the sample to be at the same temperature for the different images of the first series of images. Comparison of the images of the first series of images is then easier to perform.

To further improve characterisation of the sample, it is advantageous to acquire at least a second series of images in a step S2*c*. Among the plurality of images, at least a second series of images of the first surface of the sample 1 is acquired. The second series of images is acquired when the first surface of the sample 1 is illuminated by the first structured light.

The images of the second series of images differ from one another by different values of the exposure time of the image capture means 5. The strongly illuminated areas correspond to overexposed areas of the image. On the contrary, the weakly illuminated areas correspond to underexposed areas. By modifying the exposure time between the images of the second series of images, It is possible to have images that present artefacts having a surface that varies according to the exposure time.

By reducing the exposure time, the surface of the overexposed area is reduced which enables the extent of the artefact and therefore of the quantity of unusable information to be limited. By increasing the exposure time, the surface of the underexposed area is reduced which enables the extent of the artefact and therefore of the quantity of unusable information to be limited. By modulating the exposure time between the multiple images of the second series of images, it is easier to monitor the variation of intensity of the repetitive patterns of the first textured light.

Processing of the images of the second series of images enables the light intensity variations representative of the repetitive patterns of the structured light to be calculated more precisely. It is then possible to form a working image in which the repetitive patterns of the structured light are better defined. In advantageous manner, the light intensity variations of the structured light on the sample were extracted from the images of the second series of images. The light intensity variations are used to define a new image that is devoid of at least one artefact. In preferential manner, at least four images with four different exposure time values are acquired and are used to form a working image.

In a step 33*b*, the images of the second series of images are used to form at least one working image that is designed to form an additional reference image or to replace a reference image.

In preferential manner, the second series of images comprises at least one of the reference images, and preferably the reference image of the second series of images may also be common to the first series of images. This enables the first series of images and the second series of images to be used to form a better quality working image by reducing the number of artefacts and/or the extent of the artefacts.

It is particularly advantageous to acquire several second series of images that each have a reference image and even more preferentially a reference image that is also common to one of the several first series if this is the case. In this way, it is possible to greatly improve the quality of several reference images thereby improving the quality of calculation of the quantities representative of the sample.

In preferential manner, the exposure time is shortened with respect to the time adopted for the reference image so as to facilitate measurement of the repetitive patterns of the structured light on the surface of the substrate receiving the salient patterns 2. This image enables the measurement relating to the planarity of the surface receiving the salient patterns 2 to be improved.

In preferential manner, the exposure time ratio between the shortest time and the longest time is at least equal to 1.3, preferably at least equal to 1.6, and more preferentially at least equal to 2 or even at least equal to 5. The greater the exposure time ratio, the easier it is to discriminate between the information from the very luminous areas and the weakly luminous areas that generally correspond to the information from the substrate supporting the salient patterns 2 and the information from the reflecting areas of the salient patterns 2.

When acquisition of the second series of images is performed; it is particularly advantageous for the other parameters to preferentially be constant, in particular the parameters relating to the structured light, the application angle and the angle of observation.

In yet another advantageous embodiment, at least a third series of images is acquired. The method comprises a step 32*d* that consists in acquiring at least one image of the sample illuminated by a second structured light. The second structured light differs from the structured light used to acquire one of the reference images and preferentially the first series by the colour of the emitted light. The repetitive patterns are identical to those of the structured light of at least one reference image; i.e. in phase and frequency. Modification of the colour can be used to improve the contrast according to the materials used to form the salient patterns 2 and/or the substrate receiving the salient patterns 2.

In a step S3*c*, the images of the third series of images are used to form an image that is devoid of at least one of the artefacts. It is advantageous for the third series of images to have one of the reference images. The images of the third series of images are then used to form a working image that is designed to form an additional reference image or designed to replace one of the reference images.

It can be advantageous to acquire several third series of images each comprising one of the reference images. The several third series of images are used to replace reference images.

The projection means 4 can be configured to modify the colour of the structured light. It is advantageous for the projection means 4 to be configured to deliver a white light with black or greyscale patterns. It is also advantageous for the projection means 4 to be configured to deliver a light of another colour, for example red, blue, green, yellow, orange or violet with black or greyscale patterns or patterns of another colour.

In yet another embodiment, at least a fourth series of images is acquired. The method comprises a step S2*e* that consists in acquiring at least one image of the sample illuminated by the first structured light. The images of the fourth series of images differ from the reference images by the use of an acquisition angle that is different from that used by the image capture means 5.

The image capture means 5 are arranged to acquire at least one image at a second angle β, also called capture angle, that is different from the first angle. The second angle β is an angle between the optical axis of the image capture means 5 and the axis normal to the support 3 designed to support the sample. The image capture means are then mounted mobile and/or several capture means are used. Modification of the capture angle enables the position of the overexposed areas and the underexposed areas to be modified.

In a step S3*d*, the images of the fourth series of images are used to form an image that is devoid of at least one of the artefacts. It is advantageous for the fourth series of images to have one of the reference images. The images of the fourth series of images are then used to form a working image that is designed to form an additional reference image or designed to replace one of the reference images. Definition of a couple between the capture angle and the application angle enables a sensitivity of measurement in direction A to be defined. By modifying either one of the capture angle or the application angle, or even both, it is possible to determine the couple of angles that achieves a sensitivity of measurement in direction A that is greater than a threshold value, or even that is the best threshold value. However, one drawback of this embodiment is that it is more difficult to superimpose the images as this implies an additional calculation for the purposes of deforming the acquired images so that they come closer to the previous images. It is advantageous, in the fourth series of images, to acquire another first series of images, or even another second series of images or another third series of images, in order to calculate another surface of the salient parts. It is then possible to use the two surfaces calculated for the same salient element under different conditions to improve the precision of calculation.

In general manner, the measurement method comprises a step 33 consisting in forming at least one working image using the first series of images and advantageously at least one of the second, third and fourth series of images.

It is advantageous to produce a second series of images for the different conditions present in the first series of images, i.e. for the different values of the application angle α. The multiple second series of images enable the quality of the images of the first series of images to be improved thereby enabling a better quality working image to be formed with only the first series of images or with only the first series of images and a single second series of images.

Association of the first series of images with one or more second series of images sharing images enables a better elimination of the artefacts and/or a greater reduction of the surface of the artefacts.

The reference images originating from a first acquisition, originating from the replacement by a working image and/or corresponding to an added working image are used, as is known by the person skilled in the art, to identify the deformations of the repetitive patterns of the textured lights in order to calculate at least one quantity representative of the sample.

In preferential manner, the images of the first series of images are compared so as to identify the brightest pixels and the least bright pixels to locate a reflection and/or a refraction. The position of the brightest pixels is advantageous to locate specular reflections.

The measuring machine comprises a structured light emitter 4 configured to illuminate at least a first surface of a sample 1 with repetitive patterns and an image acquisition device 5 configured to capture a plurality of images of the first surface of the sample 1.

The measuring machine also comprises a control circuit 6 configured to define the acquisition conditions of the plurality of images by image acquisition device 5 and to acquire at least a first image of the first surface of the sample 1. The measuring machine can also comprise a memory 7 configured to store the plurality of images.

It is also preferable for the measuring machine to comprise a first movement device 8 configured to modify the angle of incline α of the light emitter 4 with respect to the first surface and therefore to the surface of the support 3. In preferable manner, the measuring machine comprises a second movement device 9 configured to modify the angle of incline of image acquisition device 5 with respect to the first surface and therefore on the surface of the support 3.

Control circuit 6 is configured to acquire several reference images of the sample 1 illuminated by different structured lights. The structured lights of the reference images each define several repetitive patterns and differ from one another by the phase and/or frequency of the repetitive patterns. The control circuit is configured to acquire a first series of images of the sample illuminated by a first structured light. The first structured light defines several repetitive patterns and the images of the first series of images differ from one another by the application angle α of the first structured light with respect to the surface of the support 3.

Control circuit 6 is configured to compare the images of the first series of images so as to determine the presence of at least one artefact on at least one image of the first series of images.

A processing circuit 10 is configured to form at least one working image at least from the first series of images, the at least one working image being devoid of said at least one artefact or reducing the extent of said at least one artefact. Processing circuit 10 is configured to calculate at least one quantity representative of the sample from the at least one working image and the reference images.

In a privileged embodiment, the sample 1 is arranged in an enclosure that is located in a topographic measuring machine. The enclosure has a glazed first surface and the projector is arranged outside the enclosure. The structured light passes through the transparent part of the enclosure to reach the first surface of the sample 1. The image capture means 5 can comprise a camera that, if present, is arranged outside the enclosure. The camera is arranged to capture the structured light applied on the surface of the sample 1 and propagating through the transparent part of the enclosure, more precisely through the glazed second surface of the enclosure.

The invention claimed is:

1. Method for performing topographic measurement that comprises:

providing a sample comprising a first surface provided with a plurality of salient patterns;

acquiring a plurality of images of the first surface of the sample illuminated with structured lights emitted at application angles with respect to the first face of the sample, each structured light defining several repetitive patterns, each structured light being defined by a phase and a frequency of the repetitive patterns, wherein the plurality of images comprises:

a plurality of reference images of the sample, each reference image corresponding to the sample illuminated at a same first application angle of the application angles, the reference images differing from one another by the phase and/or the frequency of the repetitive patterns; and at least one first series of images of the first surface of the sample, the first series of images being acquired when the first surface of the sample is illuminated by a first structured light of the structured lights, the images of the first series of images differing from one another by different application angles of the first structured light with respect to the first surface;

comparing the images of the first series of images with each other so as to determine the presence of at least one artefact on at least one image of the first series of images;

forming at least one working image at least from the first series of images, the at least one working image being devoid of said at least one artefact or reducing the extent of said at least one artefact;

calculating at least one quantity representative of the sample from the at least one working image and the reference images.

2. Method for performing topographic measurement according to claim 1 wherein the first series of images comprises a first reference image of the plurality of reference images and wherein the at least one working image replaces said first reference image to calculate the at least one quantity representative of the sample.

3. Method for performing topographic measurement according to claim 2 wherein the plurality of images comprises an additional first series of images; wherein the additional first series of images comprises an additional reference image of the plurality of reference images distinct from the first reference image, wherein the additional first series of images is used to form an additional working image devoid of at least one artefact or having an artefact of reduced extent and wherein the additional working image replaces the additional reference image, wherein the structured light of the additional first series of images differs from the structured light of the first series of images by the phase and/or the frequency of the repetitive patterns.

4. Method for performing topographic measurement according to claim 1, wherein comparison of the images of the first series of images comprises extraction of the light intensity modifications of the repetitive patterns originating from the structured light and comparison of said light intensity modifications.

5. Method for performing topographic measurement that comprises:

providing a sample comprising a first surface provided with a plurality of salient patterns;

acquiring a plurality of images of the first surface of the sample, the plurality of images comprising reference images of the sample, each reference image corresponding to the sample illuminated with a structured light, the structured lights of the reference images each defining several repetitive patterns and differing from one another by the phase and/or the frequency of the repetitive patterns;

wherein the plurality of images comprises at least one first series of images of the first surface of the sample, the first series of images being acquired when the first surface of the sample is illuminated by a first structured light, the first structured light defining several repetitive patterns and the images of the first series of images differing from one another by the application angle of the first structured light with respect to the first surface;

comparing the images of the first series of images so as to determine the presence of at least one artefact on at least one image of the first series of images;

forming at least one working image at least from the first series of images, the at least one working image being devoid of said at least one artefact or reducing the extent of said at least one artefact;

calculating at least one quantity representative of the sample from the at least one working image and the reference images;

wherein the plurality of images comprises at least a second series of images of the first surface of the sample, the second series of images being acquired when the first surface of the sample is illuminated by the first structured light, the images of the second series of images differing from one another by their exposure time, the application angle of the first structured light being constant for the second series of images and corresponding to one of the angles of the first series of images, wherein the measurement method comprises:

comparing the images of the second series of images so as to determine the presence of at least one artefact on at least one image of the second series of images and forming at least one working image at least from the second series of images, the at least one working image being devoid of said at least one artefact or reducing the extent of the artefact.

6. Method for performing topographic measurement according to claim 5 wherein the second series of images comprises an image of the plurality of reference images and wherein the at least one working image formed from the second series of images replaces said image of the plurality of reference images.

7. Method for performing topographic measurement according to claim 6 wherein the image of the plurality of reference images belongs to the first series of images and to the second series of images and wherein the first series of images and the second series of images are used to form a working image that replaces said image of the reference images.

8. Method for performing topographic measurement according to claim 5 wherein the plurality of images has several second series of images that each comprise an image of the reference images, wherein each second series of images is used to form a working image devoid of at least one artefact or having an artefact of reduced extent and wherein each working image replaces said images of the plurality of reference images.

9. Method for performing topographic measurement that comprises:

providing a sample comprising a first surface provided with a plurality of salient patterns;

acquiring a plurality of images of the first surface of the sample, the plurality of images comprising reference images of the sample, each reference image corresponding to the sample illuminated with a structured light, the structured lights of the reference images each defining several repetitive patterns and differing from one another by the phase and/or the frequency of the repetitive patterns;

wherein the plurality of images comprises at least one first series of images of the first surface of the sample, the first series of images being acquired when the first surface of the sample is illuminated by a first structured light, the first structured light defining several repetitive patterns and the images of the first series of images differing from one another by the application angle of the first structured light with respect to the first surface;

comparing the images of the first series of images so as to determine the presence of at least one artefact on at least one image of the first series of images;

forming at least one working image at least from the first series of images, the at least one working image being devoid of said at least one artefact or reducing the extent of said at least one artefact;

calculating at least one quantity representative of the sample from the at least one working image and the reference images;

wherein the plurality of images comprises at least a third series of images of the first surface of the sample, the third series of images being acquired when the first surface of the sample is illuminated by a second structured light, the images of the third series of images differing from one another by the colour of the structured light, the application angle of the second structured light being constant for the third series of images and corresponding to one of the angles of the first series of images, wherein the measurement method comprises:

comparing the images of the third series of images so as to determine the presence of at least one artefact on at least one image of the third series of images and forming at least one working image at least from the third series of images, the at least one working image being devoid of said at least one artefact or reducing the extent of the artefact.

10. Topographic measuring machine comprising:

a support having a surface designed to support a sample;

a projector configured to emit structured lights at application angles with respect to the surface of the support, the structured lights comprising several repetitive patterns defined at least by a phase and/or the frequency of the repetitive patterns;

a camera configured to acquire images of the sample illuminated by the structured lights;

a control circuit configured to acquire several reference images of the sample illuminated by the structured lights, the structured lights of the reference images differing from one another by the phase and/or the frequency of the repetitive patterns and having a predefined application angle;

wherein the control circuit is configured to acquire a first series of images of the sample illuminated by a first structured light of the structured lights, the images of the first series of images differing from one another by different application angles of the first structured light with respect to the surface of the support;

wherein the control circuit is configured to compare the images of the first series of images so as to determine the presence of at least one artefact on at least one image of the first series of images;

a processing circuit configured to form at least one working image at least from the first series of images, the at least one working image being devoid of said at least one artefact or reducing the extent of said at least one artefact;

wherein the processing circuit is configured to calculate at least one quantity representative of the sample from the at least one working image and the reference images.

* * * * *